United States Patent [19]

Metz et al.

[11] 3,762,961
[45] Oct. 2, 1973

[54] PRODUCTION OF VACANCIES IN METALS BY LASER BOMBARDMENT

[75] Inventors: Stephen A. Metz, Oxon Hill, Md.; Fred A. Smidt, Jr., Springfield, Va.

[73] Assignee: The United States of America as represented by the Secretary of the Navy, Washington, D.C.

[22] Filed: Feb. 22, 1972

[21] Appl. No.: 228,249

[52] U.S. Cl............. 148/4, 148/1, 148/134, 219/121 L, 331/94.5 A
[51] Int. Cl............. C22f 3/00
[58] Field of Search............. 148/1, 4, 11.5, 12, 148/134; 219/121 L; 331/94.5 A

[56] References Cited
UNITED STATES PATENTS 3,369,101  2/1968  Curcio ............. 331/94.5 A
3,452,178  6/1969  Kleen ............. 219/121 L

OTHER PUBLICATIONS

Metals Abstracts – 1558 – Some Mechanical Effects Produced by the Interaction of Pulsed Electromagnetic Radiation with Metals, October 1967.
Soviet Physics – Doklady, Vol. 14, No. 11, May 1970, pages 1128–1130.

Primary Examiner—Charles N. Lovell
Attorney—R. S. Sciascia et al.

[57] ABSTRACT

Lattice vacancies are induced in Ni and Va foils by bombardment of the foils with short, high-intensity laser pulses. Vacancy aggregates (voids or faulted loops) are then formed by annealing the bombarded foils at temperatures greater than about 0.3 $T_m$ (absolute melting point) where vacancies become mobile.

3 Claims, No Drawings

PRODUCTION OF VACANCIES IN METALS BY LASER BOMBARDMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the creation of vacancies in the atomic structure of metals and especially to the use of laser bombardment for the creation of such vacancies.

Evaluation of metals used in the interior of nuclear reactors, e.g., for cladding the fuel elements, is now accomplished by inserting samples in the interior chamber of the reactor, operating the reactor, and then removing and examining the sample. Damage to the metals is indicated by the presence of vacancies in the atomic structure, as well as by other changes in microstructure and mechanical properties. However, vacancy aggregates are not discernible until after several years of exposure. Thus, a need exists for a speedy method of testing metals for ability to withstand the effects of neutron bombardment.

SUMMARY OF THE INVENTION

The present invention provides a procedure for producing high concentrations of vacancies in the atomic structure of metals by bombardment of metal foils with short, high-intensity laser pulses. The vacancies are then formed into aggregates by annealing the foils at $0.3\ T_m$.

OBJECTS OF THE INVENTION

An object of this invention is to provide a method for testing the ability of metals to withstand damage from bombardment by neutrons.

Another object is to provide a method for the inducement of high concentrations of atomic-structure vacancy aggregates in metals.

DETAILED DESCRIPTION

A metal foil, e.g., pure (99.98 percent) nickel or vanadium, is bombarded by short, high-intensity laser pulses. Typically, before bombardment, a foil is rolled to a thickness of 50 microns and annealed in vacuum ($10^{-5}$ Torr) for one hour at $0.75\ T_m$ ($T_m$ = absolute melting point of the metal). The foil is masked during bombardment, leaving a circular area 3 mm in diameter exposed.

Bombardment is accomplished by a Q-switched ruby laser, for example. The intensity of the beam in a typical case is $1.5 \times 10^{+8}$ W/cm$^2$ with a pulse length of $3.5 \times 10^{-8}$ seconds, so that total energy input is 1.25 cal/cm$^2$. Assuming a reflectivity of 60 percent, this power density yields a value of 0.035 cal actually absorbed by the sample. It has been found that bombardment by only a single pulse will produce the vacancies in the foil.

A short pulse is necessary to prevent damage to the sample so that $3.5 \times 10^{-8}$ seconds is probably near the upper pulse-duration limit. But the power density of the pulse should probably be no less than about $100 \times 10^6$ Watts/cm$^2$ in order to produce vacancies. The total energy should probably be no less than 1 nor more than 2 cal/cm$^2$, this figure depending on the type of foil material — it is not desirable to exceed the yield strength of the material in the stress wave created by the laser pulse.

The impact of the laser beam produces a slight depression in the foil. There is no crater formation, although the affected areas exhibit some evidence of surface damage. The principal macroscopic damage consists of surface melting and vaporization of a few atomic layers. Heat flow into the foil is small. The maximum temperature rise calculated for a point 3 microns behind the front surface is only 500° C., while the temperature rise at the center of the sample is negligible. However, vacancy concentrations estimated to be as high as 1 atomic percent are created in the foil samples.

The bombarded foils are then annealed at temperatures greater than $0.3\ T_m$ (where $T_m$ is the absolute melting point of the metal). At this temperature and above, the vacancies will move about to form aggregates, such as voids in nickel and faulted dislocation loops in vanadium. The aggregates are identifiable as voids (in nickel) by absorption contrast under kinematic conditions, and by the increase in contrast seen in extinction contours passing through the voids. Examination of nickel foils at levels corresponding to one-quarter, one-half, and three-quarters of the foil thickness revealed that the voids are uniformly distributed through the thickness of the sample. In vanadium, the secondary products of laser damage take the form of faulted dislocation loops. These aggregates are not as clearly ascribable to vacancy condensation as the voids found in nickel. However, the fact that they form during annealing at temperatures above $0.3\ T_m$ when vacancies become mobile strongly suggests that they are vacancy in nature.

The preceding indicates that vacancy generation is an important consequence of the laser bombardment. The mechanism by which vacancies are formed during the bombardment is not immediately obvious. That they are not merely quenched in from high temperatures is evident since the formation of voids requires a vacancy concentration of the order of 1 percent. Even at the melting point of nickel, however, the equilibrium vacancy concentration is only about $10^{-3}$ atomic percent. Moreover, most of the sample is not heated appreciably.

Although quenching does not provide a satisfactory explanation, there is sufficient energy absorbed by the foil (0.035 cal), but not used to heat the front surface (0.002 cal), to produce the vacancy concentration observed (approximately 0.015 cal assuming a formation energy of 1.2 eV/vacancy). It may be that vacancy generation is associated with the passage of the shock wave or with the recurring interference between waves reflected from the free surfaces, since at any given time the energy of the pulse would be concentrated over a relatively small region of the sample.

The present procedure for the generation of high vacancy concentrations should prove an extremely useful technique for the study of vacancies and vacancy condensation processes, especialy in those materials where high-temperature phase transformations or thermal degradation of materials precludes the use of usual quenching techniques. It should also prove useful as an auxiliary technique to neutron irradiation and ion bombardment in the study of nucleation and growth of voids in metals.

Obviously many modifications and variations of the present invention are possible in light of the above teachings. It is therefore to be understood that within the scope of the appended claims the invention may be practiced otherwise than as specifically described.

We claim:

1. A method for producing vacancy aggregates in the atomic structure of metals comprising the steps of:

irradiating a sample of metal with short, high-intensity laser pulses, the energy per unit time imparted by the pulses to the metal being insufficient to substantially damage the metal surface by thermal effects, the power density per pulse being at least $100 \times 10^6$ watts/cm$^2$, and the upper limit of the pulse duration being about $3.5 \times 10^{-8}$ seconds; and annealing said sample at a temperature at least as high as that as which vacancies in the metal become mobile, the temperature being at least 0.3 $T_m$, where $T_m$ is the absolute melting point of the metal.

2. A method as in claim 1, said pulse having a total energy approximately in the range of one to two calories/cm$^2$.

3. A method as in claim 1, wherein said metal sample is a thin foil of the metal.

* * * * *